(12) United States Patent
Padhye et al.

(10) Patent No.: US 12,199,863 B2
(45) Date of Patent: *Jan. 14, 2025

(54) GHOST ROUTING

(71) Applicant: Microsoft Technology Licensing, LLC, Redmond, WA (US)

(72) Inventors: Jitendra Padhye, Redmond, WA (US); Karthick Jayaraman, Kirkland, WA (US); Wei Bai, Redmond, WA (US); Rachee Singh, Redmond, WA (US); Ryan Andrew Beckett, Redmond, WA (US); Sarah Elisabeth McClure, Berkeley, CA (US); Neha Milind Raje, Redmond, WA (US); Steven Jeffrey Benaloh, Seattle, WA (US); Christopher Scott Johnston, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/191,573

(22) Filed: Mar. 28, 2023

(65) Prior Publication Data

US 2023/0231806 A1 Jul. 20, 2023

Related U.S. Application Data

(63) Continuation of application No. 17/072,147, filed on Oct. 16, 2020, now Pat. No. 11,652,742.

(51) Int. Cl.
 *H04L 45/586* (2022.01)
 *H04L 45/02* (2022.01)
 *H04L 45/64* (2022.01)

(52) U.S. Cl.
 CPC ............ *H04L 45/586* (2013.01); *H04L 45/02* (2013.01); *H04L 45/64* (2013.01)

(58) Field of Classification Search
 None
 See application file for complete search history.

(56) References Cited

U.S. PATENT DOCUMENTS

| 9,875,174 | B1 * | 1/2018 | Brandwine | ......... G06F 11/3409 |
| 11,652,742 | B2 * | 5/2023 | Padhye | ................... H04L 43/50 |
| | | | | 370/392 |

(Continued)

*Primary Examiner* — Xavier S Wong
(74) *Attorney, Agent, or Firm* — Ray Quinney & Nebeker

(57) ABSTRACT

Ghost routing is a network verification technique that uses a portion of a production network itself to verify the impact of potential network changes. Ghost routing logically partitions the production network into a main network and a ghost network. The main network handles live traffic while the ghost network handles traffic generated for diagnostic purposes. The ghost network may have a network topology identical to the production network and may use the same hardware and software as the production network. An operator may implement a network configuration change on the ghost network and then use verification tools to verify that the network configuration change on the ghost network does not result in bugs. Verifying on the ghost network may not affect the main network. If the network operator verifies the network configuration change on the ghost network, the network operator may implement the network configuration change on the main network.

20 Claims, 6 Drawing Sheets

(56) References Cited

U.S. PATENT DOCUMENTS

2013/0185387 A1* 7/2013 Gero ................. H04L 69/04
                                                    709/217
2018/0091437 A1* 3/2018 Flajslik ............. H04L 41/0893

* cited by examiner

GHOST ROUTING

CROSS-REFERENCE TO RELATED APPLICATIONS

This application is a Continuation of U.S. application Ser. No. 17/072,147, filed on Oct. 16, 2020, the entirety of which is incorporated herein by reference.

BACKGROUND

A cloud-computing system may refer to a collection of computing devices or resources that can be accessed remotely. Stated another way, cloud computing may be described as the delivery of computing services (such as storage, databases, networking, software, applications, processing, or analytics) over the Internet. Clients may access a cloud-computing system through a client device. The cloud-computing system may include resources that provide services to clients. These resources may include processors, memory, storage, and networking hardware.

A cloud-computing system may include a number of data centers that may be located in different geographic locations. Each data center may include many servers. A server may be a physical computer system. The cloud-computing system may run virtual machines on a server. A virtual machine may be a program that emulates a distinct computer system but that can run on a server with other virtual machines. Like a physical computer, a virtual machine may include an operating system and applications.

Servers in a data center may be part of a network. A network may be a set of computing devices that use a set of communication protocols and interconnections to communicate and share resources. The interconnections between the servers may be based on a network topology. The network topology may be a layout, pattern, or organizational hierarchy that describes how the servers in the network are interconnected. The network may include network devices, such as network interface controllers, network interface cards, consoles, thin clients, smart devices, repeaters, hubs, bridges, switches, routers, modems, and firewalls. The network devices may act as intermediary devices between the servers (and external users) to route communications between and among the servers (and external users).

Network verification may include techniques that help network operators and architects design, operate, maintain, troubleshoot, and report on networks. Network verification may help networks run reliably, efficiently, and without error, even as they grow.

SUMMARY

In accordance with one aspect of the present disclosure, a system is disclosed that includes a production network that provides computing services. The production network includes computing devices that provide the computing services and network devices that route traffic to the computing devices. Each of the network devices includes hardware and network software. Each of the network devices also includes a main segment that routes production traffic for providing the computing services and uses a first set of configurations. The main segment uses the hardware and the network software to route the production traffic. Each of the network devices also includes a ghost segment that routes test traffic and uses a second set of configurations. The production traffic does not include the test traffic. The second set of configurations is different from the first set of configurations. The ghost segment uses the hardware and the network software to route the test traffic. The system also includes debugging software that generates the test traffic and verifies ghost routing tables and ghost forwarding tables of one or more ghost segments of the network devices.

The production network may further include physical interfaces between the network devices. Each of the physical interfaces may include a logical sub-interface. Adjacent main segments may maintain protocol sessions using the physical interfaces and adjacent ghost segments may maintain separate routing protocol sessions using logical sub-interfaces.

The hardware may include an application-specific integrated circuit (ASIC) and the network software may include ASIC control software.

The debugging software may verify that the ASIC and the ASIC control software operate correctly with the second set of configurations.

The ghost segment of each of the network devices may be logically segmented from the main segment using virtual routing and forwarding (VRF).

Each of the network devices may further include segmentation software that logically segments the ghost segment from the main segment.

The main segment may include a main routing table and the ghost segment may include a ghost routing table and each of the network devices may include pre-defined criteria for selecting between the main routing table and the ghost routing table for routing a packet.

The pre-defined criteria may include a policy-based routing (PBR) rule.

The PBR rule may match traffic to the ghost routing table based on specific differentiated services code point (DSCP) bits.

Changes to the second set of configurations may affect the ghost routing table but not the main routing table.

The second set of configurations may include an access-control list (ACL) or a route filter not present in the first set of configurations.

In accordance with another aspect of the present disclosure, a system is disclosed that includes a production network. The production network includes computing devices for providing computing services to customers and network devices for routing customer traffic to the computing devices. The network devices include hardware and network software. The production network also includes a main network with a first set of configurations and that routes the customer traffic to the computing devices based on main routing tables. The main network operates on the network devices and routes the customer traffic using the hardware and the network software. The production network also includes a ghost network with a second set of configurations and that routes test traffic based on ghost routing tables. The second set of configurations is different from the first set of configurations. The ghost network operates on the network devices and routes the test traffic using the hardware and the network software. The ghost network and the main network have a same topology. The system also includes debugging software that generates the test traffic and verifies the ghost routing tables of the ghost network.

The production network may further include physical interfaces between the network devices. Each of the physical interfaces may include a logical sub-interface. The main network may route the customer traffic through the physical interfaces and the ghost network may route the test traffic through logical sub-interfaces.

The ghost network may be logically segmented from the main network using virtual routing and forwarding (VRF).

The ghost network and the main network may maintain a same view of the production network and have routes to a same IP address space.

The ghost routing tables and the main routing tables may use shared ternary content-addressable memory (TCAM) entries for overlapping routes.

In accordance with another aspect of the present disclosure, a method is disclosed for implementing a configuration change on a production network. The production network provides computing services to customers, includes a first set of configurations, and includes a set of network devices including control planes and forwarding planes. The method includes generating ghost control planes and ghost forwarding planes by replicating the control planes and the forwarding planes of the set of network devices. The ghost control planes and the ghost forwarding planes operate on the set of network devices in parallel with the control planes and the forwarding planes. The method also includes routing customer traffic using the control planes, the forwarding planes, and the first set of configuration settings. The method also includes routing test traffic using the ghost control planes, the ghost forwarding planes, and a second set of configuration settings. The second set of configuration settings is different from the first set of configuration settings. The method also includes verifying, after routing the test traffic, ghost routing tables of the ghost control planes and ghost forwarding tables of the ghost forwarding planes. The method also includes routing, after verifying the routing tables and the forwarding tables of the ghost control planes and the ghost forwarding planes, the customer traffic through the control planes and the forwarding planes using the second set of configuration settings.

The method further includes detecting, after routing the test traffic, a bug originating in a ghost forwarding plane.

The method further includes detecting, after routing the test traffic, a bug resulting from interaction between a ghost control plane and a ghost forwarding plane.

The method further includes changing, after verifying the ghost routing tables and the ghost forwarding tables, the first set of configurations to be equivalent to the second set of configuration settings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings.

DETAILED DESCRIPTION

Figure 1A:
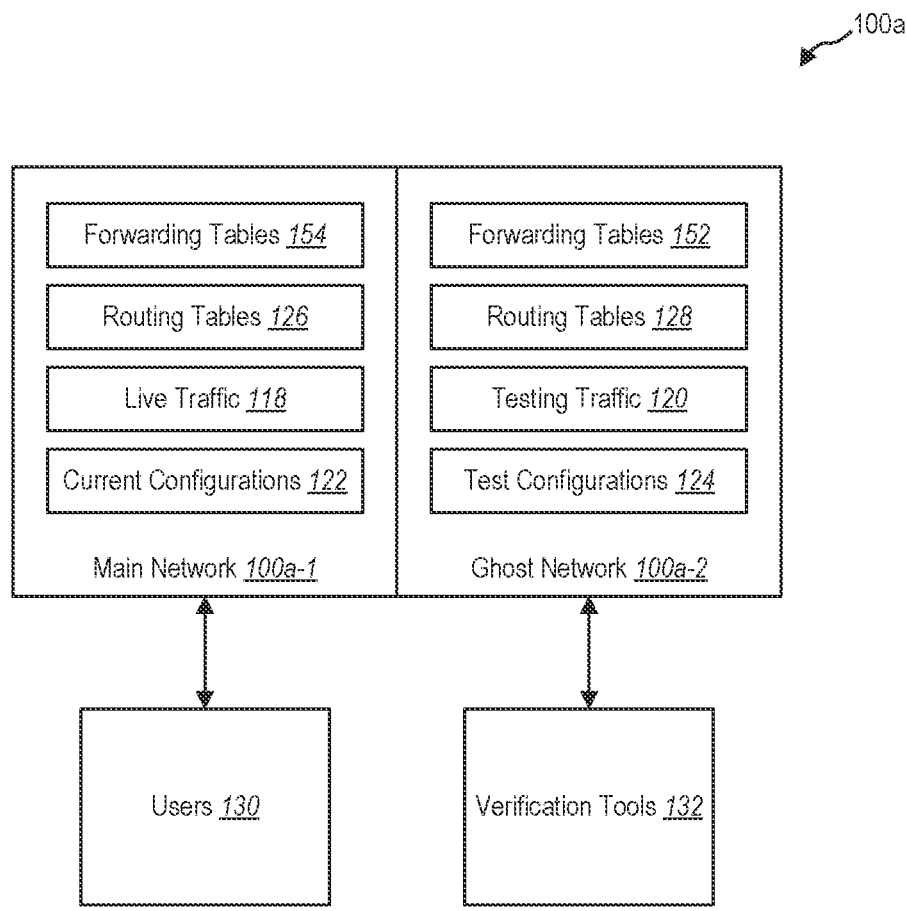
FIG. 1A illustrates an example network segmented into a main network and a ghost network.

A computer network (which may be referred to as a network) may be a set of computing devices that use a set of communication protocols and interconnections to communicate and share resources. The network may include many devices (such as the Internet or a data center of a cloud-computing system) or only a few devices (such as a residential Local Area Network). The interconnections may be based on wired technologies (such as optical fiber) or wireless technologies (such as radio and satellite technologies). The network may provide computing services to customers.

The network may be organized according to a network topology. The network topology may be a layout, pattern, or organizational hierarchy that describes how the computing devices in the network are interconnected. Example network topologies include a mesh topology, a ring topology, a star topology, a tree topology, and a bus topology. The network may include network devices, such as network interface controllers, network interface cards, consoles, thin clients, repeaters, hubs, bridges, switches, routers, modems, and firewalls. The network devices may act as intermediary devices between the computing devices (and between devices external to the network and the computing devices in the network) to facilitate communications between and among the computing devices (and between the computing devices and the devices external to the network). Computing devices (such as desktop computers, laptops, mainframes, servers, smartphones, smart devices, and tablets) may also be referred to as network devices and may also relay information from one device to another.

Transmitting information to a computing device in the network (such as from a first computing device in the network to a second computing device in the network or from a device outside the network to a computing device in the network) may involve routing the information through the network. Routing may include a process of selecting a network path for transmitting the information. The network path may include intermediary devices such as network devices. Routing may involve use of one or more routing protocols. A routing protocol may specify how network devices communicate with each other to distribute information that enables the network devices to select the network path. Routing may include use of routing tables, which may maintain a record of routes to various destinations in the network. The routing tables may include metrics (such as distances) associated with the routes and may contain information about topology of the network. The routing protocols may impact construction of the routing tables. Routing may also include use of forwarding tables. The forwarding table may include information regarding a proper output network interface to which an input interface should forward a packet. The routing tables may impact construction of the forwarding tables. The network devices may store the routing tables and the forwarding tables in memory. The network devices may include a control plane and a forwarding plane. The control plane may use the routing table and the forwarding plane may use the forwarding table.

Network operators may use network verification tools and techniques (which may be incorporated into debugging software) to design, operate, maintain, troubleshoot, and report on networks. Network verification may help networks run reliably, efficiently, and without error, even as they grow. Network verification techniques may attempt to answer one of the following two questions: (1) is the network operating as intended and (2) will the network continue to operate as intended after making a specific change (such as a specific configuration change)?

Run-time verification techniques may attempt to answer the first question. But run-time verification techniques may consider only a current network state and may not predict outcomes resulting from potential modifications to the network. Therefore, run-time verification may not answer the second question.

An ideal way to answer the second question with respect to a production network (i.e., a network carrying live traffic) may include constructing a full replica of the production network using the same hardware and software and organized with a network topology identical to the topology of the production network. The specific change could then be applied to the full replica of the production network. But building a full replica of the production network is rarely (if ever) feasible. Thus, a key challenge of network verification in predicting outcomes of network changes is to model the network with high fidelity but at a low cost.

Network simulators offer one method of modeling a network. Network simulators may model a network by reading router configurations and logically simulating underlying routing protocols in a protocol model. The simulation yields forwarding tables (forwarding information base (FIBs)), which are then verified for desired properties. This approach is cost-effective but lacks fidelity because the protocol models are not "bug-compatible" with the actual network device software. In other words, implementing the specific change on the protocol model may not reveal a bug that will manifest when the specific change goes into effect on the production network. This disparity may result from the fact that the protocol model does not use the exact same software as the production network (such as the code base that is deployed on hardware of network devices in the production network).

Another method of modeling a network is network emulation. Network emulators may overcome the shortcoming of network simulators by "emulating" the network using virtual machines that run actual router software. The virtual machines may be connected to create a large-scale emulation of a network. The virtual machines (which may act, in essence, as emulated network devices such as routers) compute FIBs, which can then be verified. This approach may have higher fidelity than simulators because the emulated routers may use the same control plane software as the production network. But the fidelity may still be incomplete because the emulation may not emulate the interaction between the control plane software (which may include the network device operating system) and the hardware of the network device. In other words, software deployed on the hardware of the network devices in the actual production network may include hooks that plug into the hardware of the network devices. Those hooks may be missing in the emulated routers. In addition, the emulation may also fail to emulate faults in the hardware itself.

This disclosure concerns a network verification technique called ghost routing. Ghost routing improves on the fidelity that network simulators and network emulators can achieve. Unlike network simulators and network emulators, ghost routing does not attempt to simulate or emulate a production network. Instead, ghost routing uses a portion of the production network itself to verify the impact of potential network changes. The portion of the production network used to verify potential network changes may be referred to as a ghost network. The ghost network may be considered a testing or diagnostic environment. Because the ghost network is implemented within the production network, the ghost network can have a network topology identical to the production network and can use the same hardware and software as the production network. The ghost network may include the same number of network devices as the production network and thus operate on the same scale as the production network. A network operator may implement a network configuration change on the ghost network and then use verification tools to verify that the network configuration change on the ghost network does not result in bugs. Verifying that the network configuration change on the ghost network may not affect live traffic on the production network. If the network operator verifies the network configuration change on the ghost network, the network operator may implement the network configuration change on a portion of the production network that carries live traffic (which may be referred to as a main network or default network).

Creating the ghost network may include logically partitioning each network device in the production network into at least two segments: a default segment (which may also be referred to as a main segment) and a ghost segment (which may also be referred to as a test segment). The default segment may have a logical identity distinct and separate from the ghost segment. The default segments may be used for production traffic (i.e., live network traffic). The ghost segments may be used for test traffic. The test traffic may be used to verify a potential network change that has been implemented on the ghost network. For each network device, the default segment and the ghost segment may use identical hardware and software (or a portion of the same hardware and identical instances of the same software). The ghost segments may make up the ghost network (the testing and diagnostics environment). The default segments may make up a main network (the production environment).

A logical partition may be a division of a network device's hardware resources into two or more sets of resources so that each set of resources may be operated independently with its own operating system instance and applications. A logical partition of a network device may be a subset of hardware of the network device that hosts a separate instance of software. The separate instances of software may be identical. Two logical partitions existing on a single network device may share hardware resources of the single network device. Two logical partitions existing on a single network device may share software resources of the single network device.

Logically partitioning a network device may mean that the default segment has a logical identity separate from a logical identity of the ghost segment, that configurations of the ghost segment may be changed without affecting configurations of the default segment, that the ghost segment and the default segment can use distinct routing tables and forwarding tables, and that the ghost segment and the default segment can use different routing policies. Logically portioning the network device may mean that a ghost segment can maintain protocol sessions with other ghost segments that are separate and distinct from protocol sessions maintained between default segments. Logically partitioning the network device may mean that traffic can be routed using only ghost segments or using only default segments. Logically partitioning the network device may mean that ghost segments communicate over interfaces that are logically distinct from interfaces over which default segments communicate. Logically partitioning the network device may, however, still allow the ghost segment and the default segment to both use the same hardware (or a subset of the same hardware) of the network device in performing network and routing functions. Logically partitioning the network device may also allow the ghost segment and the default segment to both use the same software of the network device (or identical instances of the same software) in performing network and routing functions.

One method for implementing ghost routing is through virtual routing and forwarding (VRF). Resources on a network device may be separated using VRF. For instance, in a situation in which a network device has 10 interfaces, VRF may allow a network operator to govern five interfaces based on one set of rules (such as a first set of routing policies) and to govern the other five instances based on a second set of rules. In other words, a network operator may use VRF to logically separate the 10 interfaces into two groups of five interfaces. Ghost routing may use VRF to configure a network device so that it includes two routing tables—a ghost routing table and a default routing table. When a packet arrives, the network device may select either the ghost routing table or the default routing table based on pre-defined criteria. The network device may select the default routing table unless the pre-defined criteria is satisfied. The network device may route the packet according to the selected routing table. Proposed changes to the network—such as turning off a link or changing an access-control list (ACL) or a route filter—may be staged so that they affect only the ghost routing table. Once a change is found to be safe as implemented on the ghost network, it may be ported to the default routing table. Ghost routing offers higher fidelity than any other network verification approach because it shares hardware, software, and physical topology with the production network.

The higher fidelity of ghost routing improves network verification. Hardware bugs may account for nearly 30% of bugs in a production network. These bugs may be challenging to find and fix. For example, a bug in the application-specific integrated circuit (ASIC) control software of SONIC (an open-source network operating system), called the Switch State Service (SwSS), may escape network-emulation-based verification. The bug may manifest when newly computed entries in the software FIB are not pushed to the ASIC by the SwSS. Because network emulation operates at a layer above the SwSS in a component stack of a network device, the network-emulation verification may be oblivious to a mismatch between the software FIBs and hardware FIBs. Run-time verification techniques, which check a FIB's correctness, can identify such bugs. But by the time routes are installed in the FIB of production switches, it is already too late because the fault has propagated to the network's forwarding (data) plane.

The higher fidelity of ghost routing may result not just from using identical hardware and software. The higher fidelity of ghost routing may also result from testing a change at the same scale as the production network. Ghost routing allows network operators to test changes that are nearly impossible to test by any other means. Consider, for example, distributed denial of service attacks (DDoS) mitigation. Some of the most sophisticated, large-scale DDOS attacks defy automated systems and require manual tuning of mitigation policies. These mitigation policies are double-edged swords because they can hurt production traffic. When responding to large-scale DDOS attacks, operators often need to quickly make changes to the mitigation policy as the attack evolves. The current state of the impacted services, the existing production setup, and the evolving attack scenario are impossible to emulate in a test environment. Ghost routing allows the operators to deploy the change incrementally, observe the impact, and make modifications as necessary.

FIG. 1A illustrates an example network 100a. The network 100a may be a production network that receives, generates, and routes live traffic. The network 100a may be located in a data center of a cloud-computing system. The network 100a may be a portion of a larger network. The network 100a may include computing devices and network devices. The network 100a may route information to and between the computing devices. The network 100a may route the information to and between the computing devices through the network devices. The network devices may use hardware and software to route the information and perform networking functions.

As shown in FIG. 1A, the network 100a may be partitioned into a main network 100a-1 and a ghost network 100a-2. Both the main network 100a-1 and the ghost network 100a-2 may be implemented on the network devices of the network 100a. The ghost network 100a-2 and the main network 100a-1 may be implemented on and use the same hardware. The ghost network 100a-2 and the main network 100a-1 may use the same software. In other circumstances, the ghost network 100a-2 may use software different from the main network 100a-1 in order to verify the software operates correctly on hardware of the network 100a. The ghost network 100a-2 and the main network 100a-1 may have the same scale and network topology.

The main network 100a-1 may receive and route live traffic 118. The live traffic 118 may include traffic generated and received in the course of the network 100a providing computing services. The live traffic 118 may originate from users 130 or computing devices within the network 100a. The main network 100a-1 may route the live traffic 118 using the network devices within the network 100a. The main network 100a-1 may be configured based on current configurations 122. The current configurations 122 may include routing policies.

The main network 100a-1 may include routing tables 126 and forwarding tables 154. The routing tables 126 may list routes to particular network destinations. The listed routes may include paths through the main network 100a-1 only and not through the ghost network 100a-2. The forwarding tables 154 may be used to find a correct output interface that corresponds to a particular input interface for purposes of forwarding a packet. The forwarding tables 154 may identify output interfaces within the main network 100a-1 only and not within the ghost network 100a-2. The main network 100a-1 may generate and modify the routing tables 126 and the forwarding tables 154. The main network 100a-1 may generate and modify the routing tables 126 and the forwarding tables 154 based on the current configurations 122.

The ghost network 100a-2 may receive and route test traffic 120. The test traffic 120 may include traffic that is artificially generated for purposes of verifying proper operation of the ghost network 100a-2. The ghost network 100a-2 may route the test traffic 120 using the network devices within the network 100a. The ghost network 100a-2 may be configured according to test configurations 124. The test configurations 124 may include routing policies. The test configurations 124 may be different from the current configurations 122. The test configurations 124 may include a configuration not present in the current configurations 122 or may include a configuration that is different from a configuration in the current configurations 122. The ghost network 100a-2 may receive the test traffic 120 from verification tools 132. The verification tools 132 may be referred to as debugging software. The verification tools 132 may include run-time verification tools, network simulation tools, and network emulation tools. The test traffic 120 may include traffic generated and received in order to verify that the ghost network 100a-2 operates correctly with the test configurations 124.

The ghost network 100a-2 may include routing tables 128 and forwarding tables 152. The routing tables 128 may identify paths within the ghost network 100a-2 only and not within the main network 100a-1. Similarly, the forwarding tables 152 may identify output interfaces within the ghost network 100a-2 only and not within the main network 100a-1. The ghost network 100a-2 may generate and modify the routing tables 128 and the forwarding tables 152 as the ghost network 100a-2 receives and routes the test traffic 120. The ghost network 100a-2 may generate and modify the routing tables 128 and the forwarding tables 152 based on the test configurations 124. The verification tools 132 may attempt to verify that the routing tables 128 and the forwarding tables 152 generated by the ghost network 100a-2 are correct. In this way, the verification tools 132 may determine whether the test configurations 124 are safe. The verification tools 132 may detect errors in the routing tables 128 and the forwarding tables 152. The verification tools 132 may detect errors originating in the software or the hardware of the ghost network 100a-2. The verification tools 132 may detect a source of the errors. The verification tools 132 may detect that the source of the errors is the software of the ghost network 100a-2, the hardware of the ghost network 100a-2, or the interface between the software and the hardware of the ghost network 100a-2. Because the ghost network 100a-2 uses the same software and hardware as the main network 100a-1, the verification tools 132 can predict that the test configurations 124 will create the same errors on the main network 100a-1 if implemented on the main network 100a-1. Using the verification tools 132 to verify the test configurations 124 may not affect the main network 100a-1 or the live traffic 118, the forwarding tables 154, or the routing tables 126.

In some designs, the test configurations 124 may be identical to the current configurations 122, and the ghost network 100a-2 may use software different from the main network 100a-1. In that case, the verification tools 132 may determine whether the software used by the ghost network 100a-2 will cause any errors if implemented on the main network 100a-1.

When a network device in the network 100a receives a packet, the network device may use pre-defined criteria to select either a routing table in the routing tables 126 of the main network 100a-1 or a routing table in the routing tables 128 of the ghost network 100a-2. The network device may route the packet according to the selected routing table. Proposed changes to the network 100a—such as turning off a link or changing an access-control list (ACL) or a route filter—may be first implemented in the ghost network 100a-2 through the test configurations 124. The verification tools 132 may generate test traffic 120 and verify that the proposed change to the network 100a is safe. Once the verification tools 132 verifies that the proposed change is safe, the proposed change to the network 100a may be implemented on the main network 100a-1.

Figure 1B:
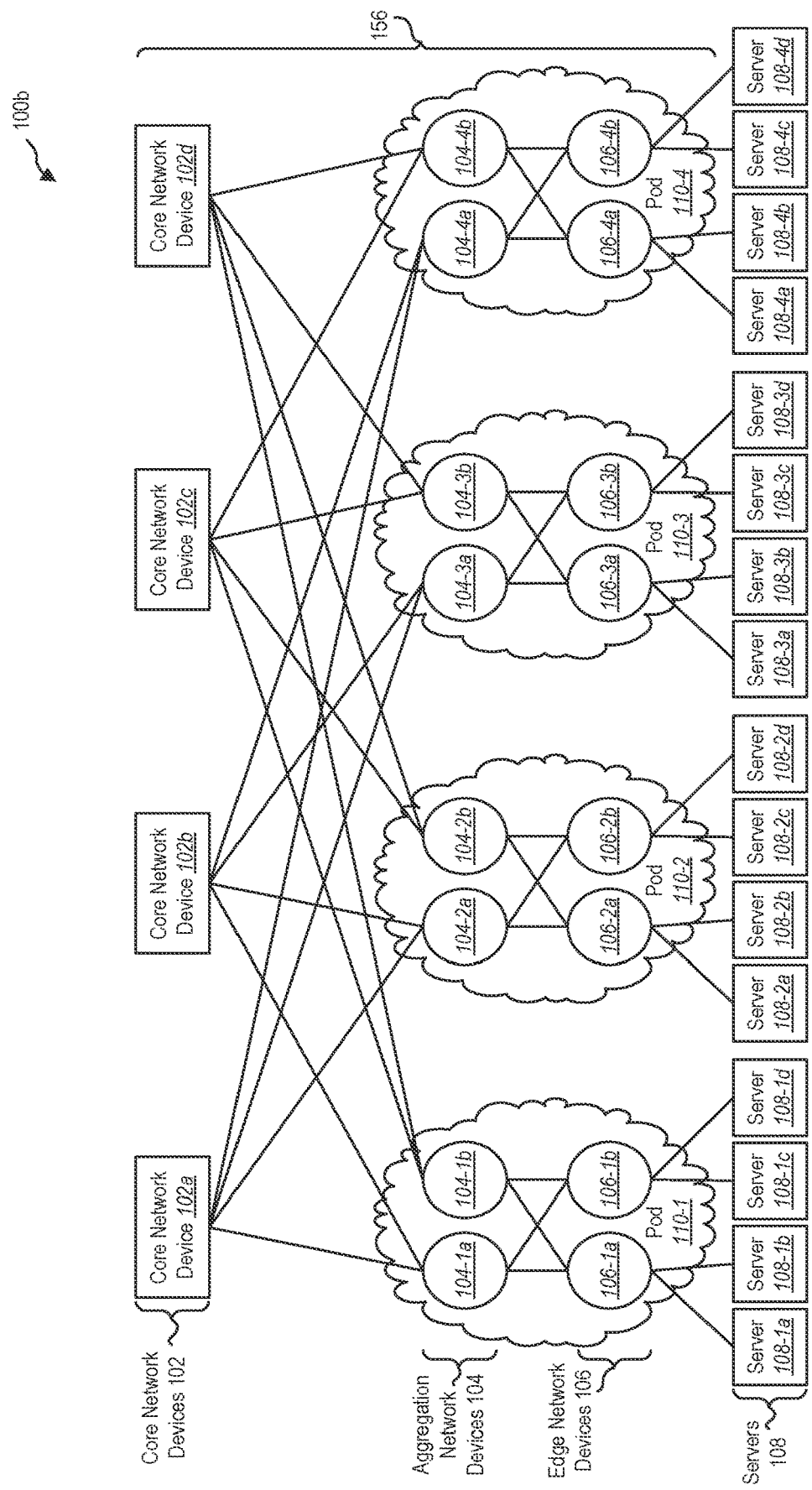
FIG. 1B illustrates an example network on which ghost routing techniques may be implemented.

FIG. 1B illustrates an example network 100b. The network 100b may be a production network. The network 100b may have any of the characteristics, elements, and functionality of the network 100a.

The network 100b may have a topology. As illustrated in FIG. 1B, the network 100b may have a fattree topology. The fattree topology may be a k-ary fat tree topology. The fattree topology may include three layers: an edge layer, an aggregation layer, and a core layer. The fattree topology may be composed of network devices (such as switches) having k ports. The core layer may include $(k/2)^2$ core switches. Each core switch may connect to k pods. Each pod may include k/2 k-port edge switches and k/2 k-port aggregation switches. Each pod may connect to or include $(k/2)^2$ servers. Each edge switch may connect to k/2 servers and k/2 aggregation switches. Each aggregation switch may connect to k/2 edge switches and k/2 core switches. A fattree network topology may have identical bandwidth at each bisection. Each layer in a fattree network topology may have a same aggregated bandwidth. Although the network 100b in FIG. 1B has a fattree topology, the network 100b may be designed according to a different topology.

The network 100b may include network devices 156 and servers 108. The network devices 156 may include core network devices 102, aggregation network devices 104, and edge network devices 106. The network devices 156 may be connected and arranged based on the topology of the network 100b.

The core network device 102a may connect to aggregation network device 104-1a, aggregation network device 104-2a, aggregation network device 104-3a, and aggregation network device 104-4a. The core network device 102b may connect to aggregation network device 104-1a, aggregation network device 104-2a, aggregation network device 104-3a, and aggregation network device 104-4a. The core network device 102c may connect to aggregation network device 104-1b, aggregation network device 104-2b, aggregation network device 104-3b, and aggregation network device 104-4b. The core network device 102d may connect to aggregation network device 104-1b, aggregation network device 104-2b, aggregation network device 104-3b, and aggregation network device 104-4b.

The aggregation network device 104-1a may connect to edge network device 106-1a and edge network device 106-1b. The aggregation network device 104-1b may connect to edge network device 106-1a and edge network device 106-1b. The aggregation network device 104-2a may connect to edge network device 106-2a and edge network device 106-2b. The aggregation network device 104-2b may connect to edge network device 106-2a and edge network device 106-2b. The aggregation network device 104-3a may connect to edge network device 106-3a and edge network device 106-3b. The aggregation network device 104-3b may connect to edge network device 106-3a and edge network device 106-3b. The aggregation network device 104-4a may connect to edge network device 106-4a and edge network device 106-4*b*. The aggregation network device 104-4*b* may connect to edge network device 106-4*a* and edge network device 106-4*b*.

The edge network device 106-1*a* may connect to server 108-1*a* and server 108-1*b*. The edge network device 106-1*b* may connect to server 108-1*c* and server 108-1*d*. The edge network device 106-2*a* may connect to server 108-2*a* and server 108-2*b*. The edge network device 106-2*b* may connect to server 108-2*c* and server 108-2*d*. The edge network device 106-3*a* may connect to server 108-3*a* and server 108-3*b*. The edge network device 106-3*b* may connect to server 108-3*c* and server 108-3*d*. The edge network device 106-4*a* may connect to server 108-4*a* and server 108-4*b*. The edge network device 106-4*b* may connect to server 108-4*c* and server 108-4*d*.

The aggregation network devices 104 and the edge network devices 106 may be arranged in pods 110-1, 110-2, 110-3, 110-4.

The core network devices 102, the aggregation network devices 104, and the edge network devices 106 may include routing tables (such as the routing tables 126, 128). The routing tables may be a routing information base (RIB). The core network devices 102, the aggregation network devices 104, and the edge network devices 106 may include forwarding tables (such as the forwarding tables 152, 154). The forwarding tables may be a forwarding information base (FIB). RIB and FIB may be stored in memory of the core network devices 102, the aggregation network devices 104, and the edge network devices 106. The RIB may be used by software operating on a network device. The FIB may be used by hardware of the network device. The core network devices 102, the aggregation network devices 104, and the edge network devices 106 may also include configurations.

Each of the network devices 156 may include software and hardware. The software may include a network operating system and ASIC control software. The software may include routing protocols, such as Border Gateway Protocol (BGP), Open Shortest Path First (OSPF), and Link Layer Discovery Protocol (LLDP). The hardware may include transceivers, central processing units (CPUs), and ASICs. Each of the network devices 156 may include an interface between the software and the hardware. Each of the network devices 156 may include network configuration information.

Each of the network devices 156 may include a control plane and a forwarding (data) plane. The control plane may be where a network device makes decisions. The control plane may be optimized for customizability, handling policies, handling exceptional situations, and facilitating and simplifying data plane processing. The control plane may store routing protocol of the network device. The control plane may be software based and may use a central processing unit rather than specialized hardware. The control plane may use a RIB to route packets. The control plane may use data from the RIB to populate a FIB. The data plane may, in contrast, handle traffic that passes through the network device. The data plane may be optimized for speed of processing and for simplicity and regularity. The data plane may use the FIB to look up packets and decide how to handle them. The data plane may rely primarily on hardware. For example, the data plane may perform Cisco Express Forwarding (CEF) lookups and use special ASICs.

The core network devices 102, the aggregation network devices 104, and the edge network devices 106 may route information (such as a packet) to an intended server among the servers 108. For example, the core network device 102*b* may receive a packet intended for the server 108-4*c*. The core network device 102*b* may route the packet to the aggregation network device 104-4*a*. The core network device 102*b* may use a forwarding table or a routing table to route the packet. The aggregation network device 104-4*a* may route the packet to the edge network device 106-4*b*. The aggregation network device 104-4*a* may use a forwarding table or a routing table to route the packet. The edge network device 106-4*b* may route the packet to the server 108-4*c*. The edge network device 106-4*b* may use a forwarding table or a routing table to route the packet.

The network 100*b* may be partitioned into a ghost network (such as the ghost network 100*a*-2) and a main network (such as the main network 100*a*-1). The ghost network may be created using ghost routing. Ghost routing may include replicating control planes and forwarding planes of the network devices 156 of the network 100*b* into ghost instances (or ghost segments). These ghost instances may include ghost control planes and ghost forwarding planes. The ghost instances may exist on the network devices 156 whose control planes and forwarding planes were replicated. Ghost routing may include logically partitioning the ghost control planes and ghost forwarding planes from the control planes and the forwarding planes of the network devices 156 of the network 100*b*. The ghost network may be composed of the ghost control planes and the ghost forwarding planes. The main network may be composed of the control planes and the forwarding planes of the network devices 156 of the network 100*b*. Because the ghost control planes and the ghost forwarding planes exist on the network devices 156 that are part of the network 100*b*, the ghost control planes and the ghost forwarding planes are privy to the same software and hardware faults as the network devices 156 of the network 100*b*.

Described in another way, implementing the ghost network on the network 100*b* may include segmenting each of the network devices 156 into two separate logical segments: a default (or main) segment responsible for routing production traffic and a ghost (or test) segment for diagnostic functionality. The ghost network may include the ghost segments, and the main network may include the main segments. The default segments may use hardware (or a portion of the hardware) and software (or an identical instance of the software) of the network devices 156. The ghost segments may use hardware and software identical to the hardware and the software that the default segments use. In this way, the ghost segments may maintain ideal bug-parity with the network 100*b* and the default segments.

Although the ghost segments may use the same hardware and the same software as the main segments, the ghost network may include configurations different from configurations of the main network. Changing configurations of the ghost network may not affect configurations of the main network, production traffic on the main network, routing tables of the main network, or forwarding tables of the main network. Some examples of differences in configurations between the ghost network and the main network may include: a link in the ghost network that is turned off may be turned on in the main network; an access-control list (ACL) or a route filter in the ghost network that is different from the main network; BGP Multi Exit Discriminator (MED) of routes to a destination prefix in the ghost network may be different from the main network; routing configuration in the ghost network may be different from the main network; and the ghost network may include static routes into the BGP process not included in the main network.

The difference(s) in configurations between the ghost network and the main network may result in the ghost segments having ghost routing tables and ghost forwarding tables that are different from main routing tables and main forwarding tables of the main segments. The ghost segments may route traffic within the ghost network based on the ghost routing tables and the ghost forwarding tables. The main segments may route traffic within the main network based on the main routing tables and the main forwarding tables. Changes to the ghost routing tables and the ghost forwarding tables may not affect the main routing tables or the main forwarding tables.

Segmenting the network 100b into a ghost network and a main network using ghost routing may enable staged configuration changes to the network 100b. Changes to the configuration of network devices (such as the introduction of new route filters and edits to routing configuration) may be first performed in the ghost network. Once the changes are verified (found to be safe), the changes are carried over to the main network. Thus, ghost routing may expose faults in the network device configuration, software (such as the network operating system), and network hardware before the changes are applied to the main network.

One way to logically segment the network devices 156 is through virtual routing and forwarding (VRF). Operating systems of the network devices 156 may natively support VRF. VRF may logically segment a network device into multiple virtual devices, each with its own routing processes, configuration, RIB, and FIB. VRF may be used to logically segment each of the network devices 156 into a default VRF and a ghost VRF. Absent a user-configured VRF, routing configuration on a network device may be part of the default VRF and traffic may flow through the default VRF. The default VRF may maintain Border Gateway Protocol (BGP) sessions with peers, exchange routes, and forward production traffic. Ghost routing may configure the ghost VRF on network devices to use the same software and hardware as the default VRF and to participate in diagnostic activities in a way that does not impact production traffic. The ghost VRF may, however, include its own routing processes, configurations, RIB, and FIB separate from the default VRF. The ghost VRF may maintain protocol sessions with peer ghost VRF, exchange routes, and forward test traffic. Traffic may flow through the ghost VRF only if the traffic satisfies pre-defined criteria.

Causing the ghost VRF to use the software and the hardware of the default VRF may allow ghost routing to effectively verify behavior of the production network. For the ghost VRF to mimic the default VRF, the ghost VRF may need to maintain adjacencies identical to the default VRF. Mimicking adjacencies may be challenging because network devices may interconnect over a single physical interface and the single physical interface may belong to only one VRF by design. To solve this challenge ghost routing may configure a logical sub-interface on each physical interface of a network device. The logical sub-interface may be allocated to the ghost VRF. The physical interface may remain allocated to the default VRF. Both the logical sub-interface and the physical interface may maintain separate routing protocol sessions with neighboring devices. The ghost VRF of a network device may maintain protocol sessions with other ghost VRFs on neighboring network devices using the logical sub-interfaces. In this manner, the ghost VRF mimics a control plane of the default VRF without requiring any changes to network topology.

Ghost routing may provide an ability to route network packets selectively through the default VRF or the ghost VRF. Using debug infrastructure and software, packets may be routed via the ghost network to verify application-specific integrated circuit (ASIC) forwarding behavior. Ghost routing may identify debug packets using indicators such as specific differentiated services code point (DSCP) bits and route them to the ghost VRF. All production traffic may be routed by the default VRF.

To implement the selection of routing tables in this manner ghost routing may configure a policy-based routing (PBR) rule on all interfaces of a network device. This PBR ghost rule may match traffic (on DSCP bits or IP protocol) and route it to the ghost VRF. The routing may occur in hardware thereby not incurring any additional delay. Because ghost routing uses existing features of network device operating systems, it can be deployed in production networks.

To verify the impact of a configuration change (such as changing the BGP Multi Exit Discriminator (MED) of routes to a destination prefix) a network operator may implement the configuration change in the ghost VRF and verify correctness of the RIB and FIB using a run-time verification technique or a network simulator technique. Once the network operator verifies the configuration change in the ghost VRF, the configuration change may be replicated in the default VRF. Replicating the configuration change between the ghost VRF and the default VRF may be seamless because both the ghost VRF and the default VRF may maintain the same view of the production network and have routes to the same IP address space.

The ghost VRF may consume hardware resources of a network device to perform verification tasks. This reduction in resources available for production traffic may not, however, impact performance of the production network. For example, datacenter network devices may have low CPU utilization and adding the ghost VRF may be unlikely to tangibly impact CPU utilization on the network device. A number of routes installed on a forwarding plane of a network device may be limited by a total ternary content-addressable memory (TCAM) on a switching chip. VRFs may share this global limitation. Therefore, routes in the ghost VRF may need to be accommodated using available TCAM on the network device. An estimate of extra TCAM entries required by the ghost VRF may be as follows. In a k-ary fattree datacenter topology there may be k pods. Each pod may include k network devices in two layers. If each top-of-rack (ToR) network device has c prefixes, a total number of prefixes in a production network may be $c*k^2/2$. In a naive case, the ghost VRF may install all $c*k^2/2$ routes in the production network, at least doubling existing TCAM utilization on the network devices. It may be that the average TCAM utilization of datacenter network devices is less than 40%. Thus, even the naive implementation of ghost VRFs may be accommodated using the existing TCAM of network devices.

Figure 2:
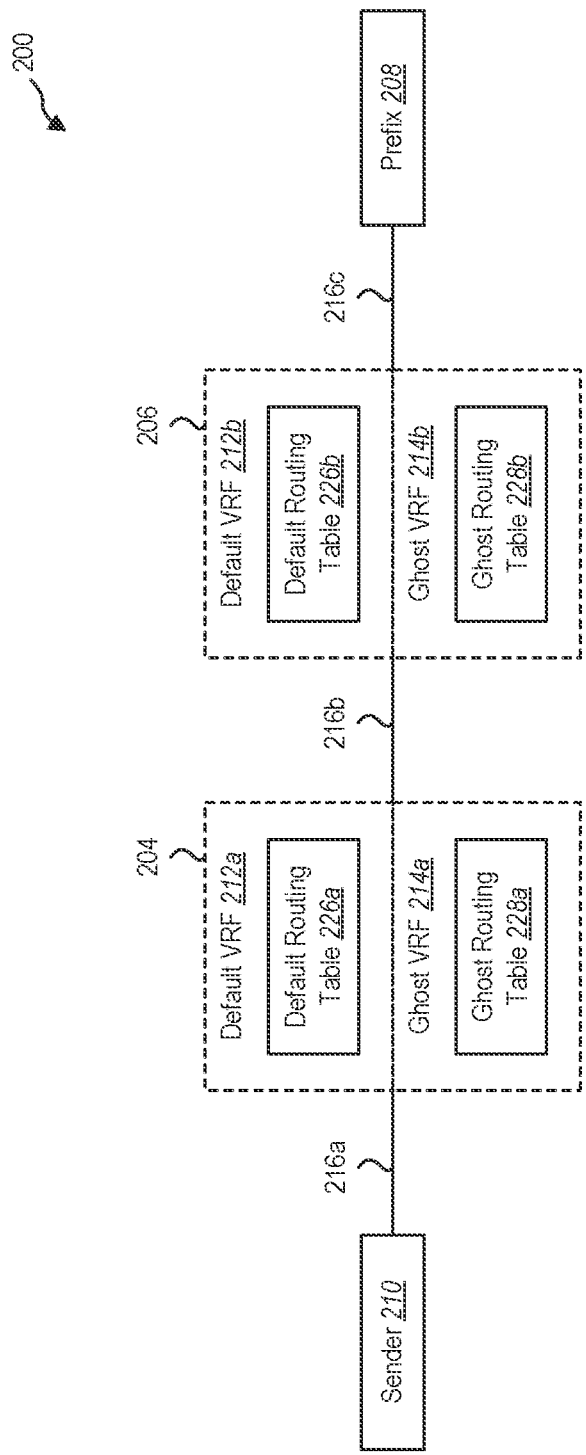
FIG. 2 illustrates example network devices segmented into default segments and ghost segments.

FIG. 2 illustrates an example network 200. The network 200 may be part of a larger network. The network 200 may include a network device 204 and a network device 206. A physical interface 216b may connect the network device 204 and the network device 206. The network device 204 and the network device 206 may be switches. A sender 210 may be connected to the network device 204 over a physical interface 216a. The network device 206 may be connected to prefix 208 over physical interface 216c. Although FIG. 2 shows the network device 204 as being connected to only one network device (the network device 206), in other designs a network device may be connected to more than one network device.

The network device 204 may include a default VRF 212a and a ghost VRF 214a. The default VRF 212a may route production traffic. The default VRF 212a may route the production traffic according to default routing table 226a. The ghost VRF 214a may route test traffic. The ghost VRF 214a may route the test traffic according to ghost routing table 228a. The network device 206 may include a default VRF 212b and a ghost VRF 214b. The default VRF 212b may route the production traffic. The default VRF 212b may route the production traffic according to default routing table 226b. The ghost VRF 214b may route the test traffic. The ghost VRF 214b may route the test traffic according to ghost routing table 228b. The ghost VRF 214a and the ghost VRF 214b may be part of a ghost network. The default VRF 212a and the default VRF 212b may be part of a main network.

Implementing ghost routing on the network 200 may include configuring logical sub-interfaces on the physical interfaces 216a-c. Each logical sub-interface may be assigned to a ghost VRF. The physical interface 216a may be configured to include a first logical sub-interface. The first logical sub-interface may be assigned to the ghost VRF 214a. The physical interface 216b may be configured to include a second logical sub-interface. The second logical sub-interface may be assigned to the ghost VRF 214a on the one hand and the ghost VRF 214b on the other hand. The second logical sub-interface may be included in the ghost network. The physical interface 216c may be configured to include a third logical sub-interface. The third logical sub-interface may be assigned to the ghost VRF 214b.

The network device 204 and the network device 206 may operate with two parallel BGP routing sessions between the network devices 204, 206—one on the second logical sub-interface and the other on the physical interface 216b. These two BGP sessions may have identical configuration but one may exist in the default VRFs 212a-b and the other in the ghost VRFs 214a-b. The network devices 204, 206, the physical interfaces 216a-c, the first logical sub-interface, the second logical sub-interface, and the third logical sub-interface may be configured for policy-based-routing to match on Internet Control Message Protocol (ICMP) packets and route matched packets via the ghost VRF.

In the ghost VRF 214b, ghost routing may include configuring a connected route to the prefix 208. A next hop to the prefix 208 may include the second logical sub-interface. This connected route may be redistributed into BGP on the ghost VRF 214b. The ghost VRF 214a may learn the route to the prefix 208 from the network device 206. The default VRFs 212a-b may not have the route to the prefix 208. The sender 210 may ping the prefix 208. While the default VRF 212a may not have a route to the prefix 208, the PBR configuration may route ICMP packets to the ghost VRF 214a. The ghost VRF 214a may have the route to the prefix 208. Thus, packets to the prefix 208 from the sender 210 may be routed via the ghost network to the prefix 208. The introduction of the route to the prefix 208 may be done entirely in the ghost network, with no configuration change in the default VRFs 212a-b. Reaching the prefix 208 may be done using only the ghost network.

It may be possible to measure TCAM overhead of having the ghost VRFs 214a-b maintain an identical set of routes as the default VRFs 212a, 212b. An ExaBGP speak on a Linux host may announce 5,000 BGP prefixes to the default VRF 212a. Five thousand IPv4 routers may occupy 2,500 longest prefix match (LPM) TCAM entries, using 30% of the TCAM of the network device 104. After enabling the ghost VRF 214a, another ExaBGP speak may announce the same set of 5,000 BGP prefixes to the ghost VRF 214a. Final TCAM utilization may be 60% or double the utilization of the default VRF 212a. A naive implementation of ghost routing may double the TCAM utilization on the network device 204 (which may be an Arista 7060 Hardware SKU) but there may be no additional TCAM overhead involved.

After validating a configuration change on the ghost VRFs 214a-b, the configuration change may be ported to the default VRFs 212a-b as-is. The default VRFs 212a-b and the ghost VRFs 214a-b may have overlapping IP address spaces. Thus, the static route to the prefix 208 may be configured in the default VRFs 212a-b as it was in the ghost VRFs 214a-b. The redistribution of static routes into the BGP process may be the only global configuration change that needs to be ported from the ghost VRFs 214a-b to the default VRFs 212a-b.

Figure 3:
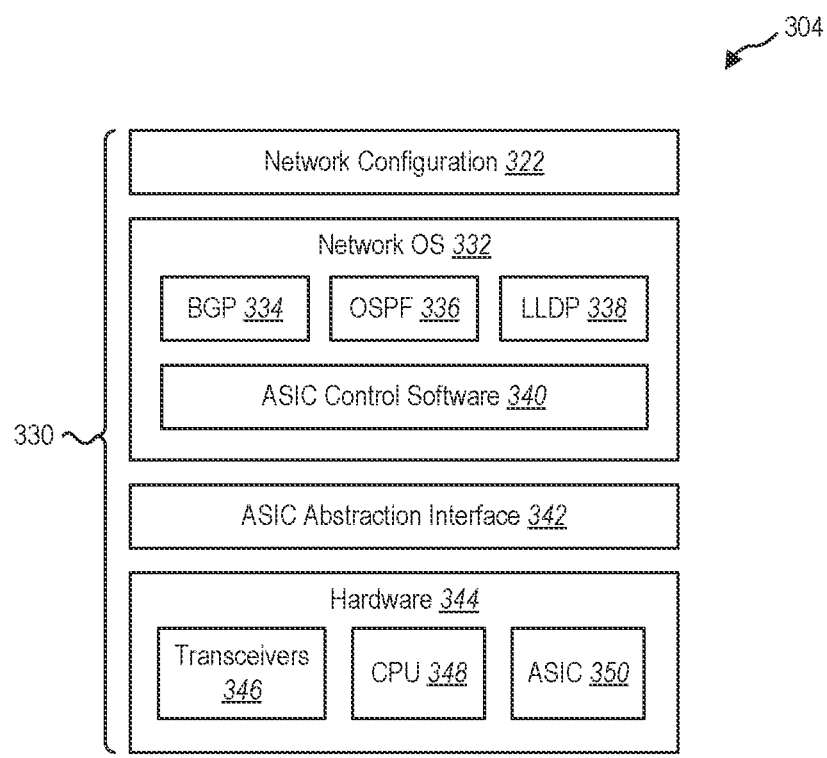
FIG. 3 illustrates an example network switch component stack.

FIG. 3 illustrates an example network switch component stack 330. The network switch component stack 330 may be part of a network device 304. The network switch component stack 330 may include network configuration 322, network OS 332, ASIC abstraction interface 342, and hardware 344. The network OS 332 may include routing protocols, such as BGP 334, open shortest path first (OSPF) 336, and link layer discovery protocol (LLDP) 338. The network OS 332 may include ASIC control software 340. The hardware 344 may include transceivers 346, CPU 348, and ASIC 350.

A network emulator may be capable of verifying the network configuration 322, the Network OS 332, the BGP 334, the OSPF 336, and the LLDP 338. But the network emulator may not be able to verify ASIC control software 340, the ASIC abstraction interface 342, the hardware 344, the transceivers 346, the CPU 348, and the ASIC 350. Ghost routing, in contrast, verifies both production software and production hardware. Thus, ghost routing enables verification of all components shown in FIG. 3. In other words, ghost routing may enable the detection of bugs generated by all components of the network switch component stack 330.

Figure 4:
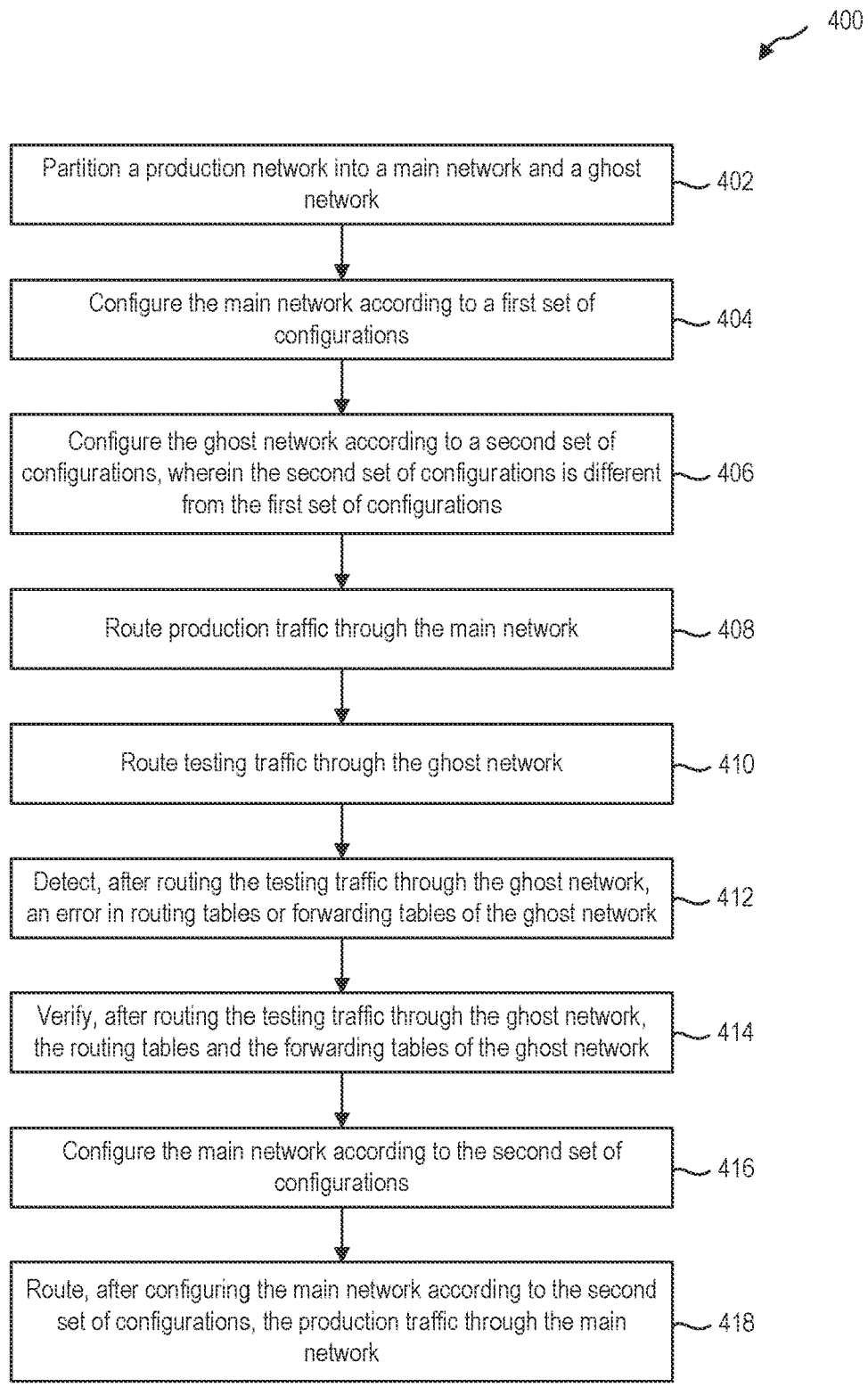
FIG. 4 illustrates an example method for changing configuration settings of a production network.

FIG. 4 illustrates an example method 400 for modifying configuration of a production network. The production network may include network devices. The network devices may include hardware and software. The production network may be located in a data center of a cloud-computing system. The production network may provide computing services to users. The production network may be configured according to a set of configurations.

The method 400 may include partitioning 402 the production network into a main network and a ghost network. The main network may handle live traffic associated with providing the computing services to the users. The main network may be a production environment. The ghost network may handle diagnostic traffic for testing potential configuration changes to the production network. The ghost network may be a testing environment. The main network and the ghost network may have a scale and topology identical to the production network. The main network and the ghost network may use the same hardware (or a subset or portion of the same hardware) and the same software (or duplicate instances of the same software) of the production network. Alternatively, the main network and the ghost network may use the same hardware but different software. Partitioning 402 the production network into the main network and the ghost network may include logically segmenting each of the network devices into a main segment and a ghost segment. The main segment and the ghost segment may both use the hardware (or a portion or subset of the hardware) and the software (or instances of the software) of the network device. Partitioning 402 the production network into the main network and the ghost network may be done through virtual routing and forwarding (VRF) or using segmentation software residing on the network device.

The method 400 may include configuring 404 the main network according to a first set of configurations. The first set of configurations may include network configurations, router configurations, or routing policies. The first set of configurations may be identical to the set of configurations of the production network.

The method 400 may include configuring 406 the ghost network according to a second set of configurations, wherein the second set of configurations is different from the first set of configurations. The second set of configurations may include network configurations, router configurations, or routing policies different from the first set of configurations.

The method 400 may include routing 408 production traffic through the main network. The production traffic may include the live traffic associated with providing the computing services to the users. Routing 408 the production traffic through the main network may include routing the production traffic based on main routing tables included on the main segments of the main network.

The method 400 may include routing 410 test traffic through the ghost network. The test traffic may be artificially generated traffic. Routing 410 the test traffic through the ghost network may include routing the test traffic based on ghost routing tables included on the ghost segments of the ghost network. Routing 410 the test traffic through the ghost network may have no effect on the main network, the main routing tables, or the production traffic.

The method 400 may include detecting 412, after routing the test traffic through the ghost network, an error in routing tables or forwarding tables of the ghost network. Detecting 412 the error in the routing tables or the forwarding tables of the ghost network may include determining an origin of the error. Detecting 412 the error may include determining that the error originated in hardware of the network devices. Detecting 412 the error may include determining that the error originated in hardware control software of the network devices. Detecting 412 the error may include determining that the error originated at an interface between software and hardware of the network devices.

The method 400 may include verifying 414, after routing the test traffic through the ghost network, the routing tables, and the forwarding tables of the ghost network. Verifying 414 the routing tables and the forwarding tables of the ghost network may include resolving the error detected in the routing tables or the forwarding tables of the ghost network. A run-time verification technique or a network simulator technique may verify the routing tables and the forwarding tables.

The method 400 may include configuring 416 the main network according to the second set of configurations.

The method 400 may include routing 418, after configuring the main network according to the second set of configurations, the production traffic through the main network.

Implementing ghost routing may include managing use of TCAM on network devices. TCAM on switches may be limited in commercial offerings. Measuring TCAM utilization of switches in data centers of a commercial cloud provider over time may show that TCAM utilization is low—less than 42% for over 75% of the switches. As a result, most datacenter switches may include sufficient TCAM slack to incorporate ghost VRF routing entries. But even though a majority of datacenter switches may have enough spare TCAM to safely run a completely separate ghost VRF without exhausting resources, there may be some switches that, at times, exceed 50% utilization in handling production traffic. Furthermore, even for those switches that remain under 50% utilization, nearly exhausting all TCAM resources on a switch by running both the main VRF and ghost VRF may be dangerous. For example, the switch may become incapable of installing new routes announced by peers in the default VRF.

There may be ways to optimize TCAM use of the ghost VRF to avoid exhausting memory. First, ghost routing may use shared TCAM entries for both the main VRF and the ghost VRF for overlapping routes. There may be a large degree of overlap in routes that exist between the default VRF and the ghost VRF. In many cases, the ghost VRF may be largely the same as the default VRF modulo any changes made by the operator. More specifically, in many cases the main VRF and the ghost VRF will have the same forwarding entry in the FIB for the same prefix and next hop. As a result, a strategy to optimize the router implementation is to use a shared TCAM entry for both the main VRF and the ghost VRF. Second, ghost routing may slice a production network into two or more parts. Ghost routing may then target a subset of the full production network in the ghost VRF. Such slicing could be done in several ways. One way is to configure only a subset of the prefixes advertised into the data center. Another way is to run the ghost VRF on only a subset of the full production network, similar to a "safe boundary" approach used by network emulators. For example, assume that in FIG. 1B, a vertical line begins in between the core network device 102b and the core network device 102c and runs vertically down in between the pod 110-2 and the pod 110-3 and the server 108-2d and the server 108-3a. That line may be a safe boundary. By defining a safe boundary and verifying routes announced by devices within the safe boundary, the number of routes per ghost VRF may be reduced by half.

Ghost routing may include protection mechanisms to ensure that the main VRF is not affected by the ghost network even when memory exhaustion is unavoidable. Routers may have limited resources (such as CPU, RAM, TCAM, and buffer space). Limiting the impact of the ghost VRFs on each of these resources may protect the main VRF from performance issues. Configuration alone, without requiring changes to underlying hardware, can place restrictions on these resources. For example, to limit the impact of the ghost VRF on RAM and TCAM, ghost routing may configure routing protocols to limit a maximum number of routes that the ghost VRF will keep in memory. BGP, for example, may have a maximum-prefix command that can be applied in the ghost VRF to control the use of resources.

Implementing ghost routing may involve using switches that include virtualization capabilities for layer 2. Vendors may provide abstractions for virtualizing layer 3 routing and forwarding. Ghost routing may include utilizing network devices that provide similar mechanisms for layer 2 features and protocols (e.g., LLDP, address resolution protocol (ARP)). Ghost routing may include implementing virtualizing mechanisms for layer 2 features on network devices. It may be that the buffer space on the physical interfaces is shared with the configured sub-interfaces. As a result, changes to how the buffer is shared by traffic priority queues may impact both the ghost VRF and the default VRF. Utilizing switches that include layer 2 virtualization capabilities may allow for decoupling the default network and the ghost network as much as possible. Logical separation may be accomplished in some instances through traditional configuration.

Implementing ghost routing may include using configuration to set quality of service (QoS) parameters. Ghost routing allows for accurate performance testing and measurement. To protect production traffic from being impacted by test traffic ghost routing may use configuration to set quality of service parameters that deprioritizes test traffic. Quality of service policies may be set for each logical sub-interface using configuration commands, such as service-policy on Cisco switches.

Porting test configurations that have been verified in the ghost VRF to the default VRF may include selectively applying configurations on the logical sub interfaces in the ghost VRF to the physical interfaces in the default VRF. The default VRF may maintain protocol sessions with neighboring routers over physical interfaces. The ghost VRF may maintain protocol sessions with neighboring routers over logical sub-interfaces. Configurations on the sub-interface, such as ACLs and QoS policy, may need to be selectively applied to the physical interface in the default VRF. Similarly, a global configuration may be used to map the logical sub-interface name to the corresponding physical interface name. For example, the command IP route 1.2.3.4/24 ethernet3.1 in the ghost VRF may be equivalent to IP route 1.2.3.4/24 ethernet3 in the default VRF.

Ghost routing may include utilizing automation tools of a production network to configure the production network to build an isolation abstraction between the two networks (a ghost network and a main network).

Network verification tools largely take two different forms: data plane verification and control plane verification. Data plane verification tools may consume models of the forwarding behavior of a network, such as simulation-computed or production-collected FIBs, and compare against invariants such as reachability. Ghost routing may be used to produce the data plane models for these tools with higher fidelity to the production hardware than is otherwise possible.

Control plane verification tools may synthesize configuration information and compute a representation of the network that can be reasoned about. Ghost routing is a higher-fidelity alternative to computing the resulting forwarding behavior of the network. Instead of relying upon unrealistically ideal behavior or inherently incomplete models of devices, ghost routing produces FIBs exactly as the device would in production.

Network emulators attempt to reach higher fidelity than simulation tools. These approaches may be more bug-compatible with production switches than alternative models of switching behavior. Further hardware fidelity may be achieved in systems that include physical switches in the loop to achieve higher realism than emulation alone. Similarly, simulators have been deployed as extensions of hardware test beds to compromise between cost and fidelity. ASIC emulation may be added to an emulator as well. None of these extensions reach the level of production bug compatibility of ghost routing.

Instead of maintaining a parallel test bed, ghost routing achieves the realism of a hardware replica of a production network without requiring the enormous overhead of a clone of the setup. Furthermore, ghost routing is not limited to layer 2 topologies but also provisions layer 1 topologies. Moreover, ghost routing does not require a centralized controller to manage non-default-path traffic and can operate on standard network devices. The ghost network can maintain the same control plane configuration and peers as the production network on the same physical interfaces while still maintaining traffic isolation.

Ghost routing may include limiting a number of network devices participating in a ghost network. Alternatively, the control plane may be compressed to a similar but smaller network. These approaches may improve the practicality of a complete ghost network deployment. Additionally, the overhead burden on the production infrastructure to maintain ghost routes may further be minimized through TCAM optimization. By merging shared prefixes, significant amounts of costly TCAM space may be saved. TCAM minimization approaches that find equivalent classifiers of an FIB may also reduce the burden.

Ghost routing may enable new and useful network management applications.

Ghost routing enables proactive network change validation with hardware-level fidelity. Operators can change network configuration without worrying about mistakes taking down a production network. Operators can also know that the resulting network state is accurate all the way from the configurations down to the hardware itself. Because hardware bugs are one of the main sources of network errors in practice, achieving this level of fidelity is significant. Moreover, there is no risk of modeling errors (e.g., with network simulators) and analyzing stale data (e.g., metadata issues).

With the increasing popularity of containerized network operating systems like SONIC, network operators can run different routing suites, e.g., Quagga and Free-Range Routing (FRR), on switches. Ghost routing enables operators to test new routing suites with hardware-level fidelity and at production network scale. Operators can simultaneously run two different routing suites on a switch—one in the default VRF and test the new suite in the ghost VRF.

In some scenarios, changes to the network configuration have to be made in real time to adapt to traffic patterns. For instance, when the network is under distributed denial of service attacks (DDoS), operators have to install protective configuration to de-prioritize or drop attack traffic while the attack continues to evolve. The impact of these policies on customer traffic must be monitored simultaneously to prevent any collateral damage of the mitigation strategy. Any single device observes a small portion of the overall network traffic, making it challenging to validate the configuration by selectively deploying it on a subset of devices. Using ghost routing, network operators can apply the protective quality-of-service (QOS) policy in the ghost VRF across all switches in the network and incrementally route traffic through the ghost VRF-limiting potential collateral damage of the QoS policy.

Ghost routing enables painless migrations and other large-scale networking changes. Operators may be required to plan large network changes in small incremental parts, each of which must be carefully considered and evaluated ahead of time. This is similar to the idea of "building a plane while you fly" and greatly reduces the velocity with which operators can evolve their network over time. Ghost routing enables an alternative-perform the entire migration/change using the ghost network. Operators can test all their changes on the ghost network, and once they are ready, can begin shifting traffic incrementally from the main network to the ghost network without worrying about the intermediate network state. Once all traffic has been shifted to the ghost network, it now becomes the new main network and the old network becomes the new ghost network.

Figure 5:
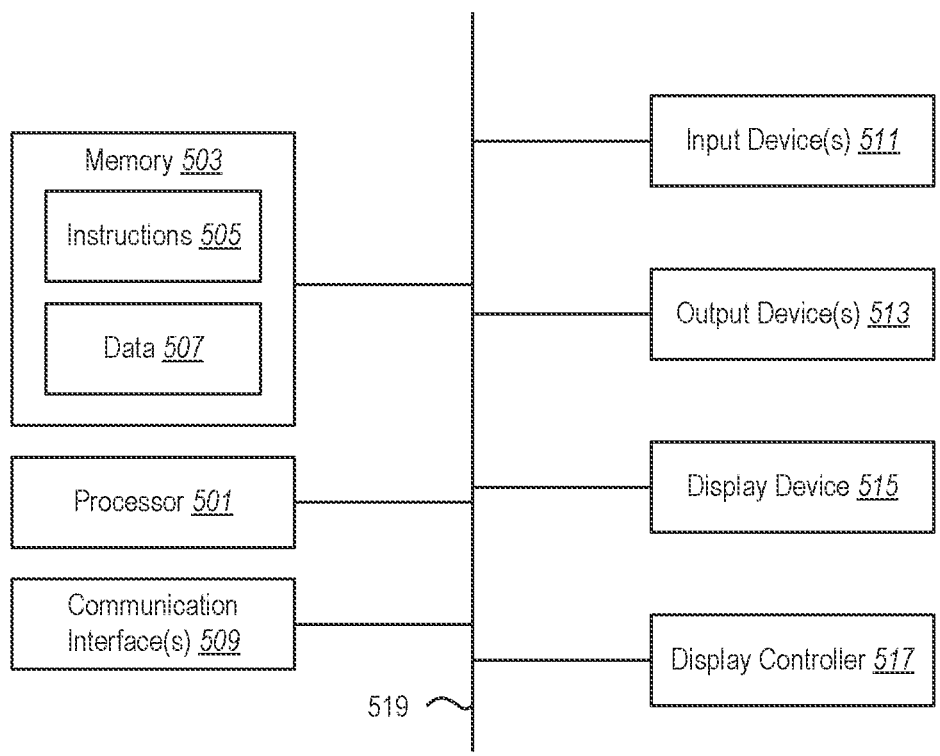
FIG. 5 illustrates certain components that can be included within a computing device.

Reference is now made to FIG. 5. One or more computing devices 500 can be used to implement at least some aspects of the techniques disclosed herein. FIG. 5 illustrates certain components that can be included within a computing device 500.

The computing device 500 includes a processor 501 and memory 503 in electronic communication with the processor 501. Instructions 505 and data 507 can be stored in the memory 503. The instructions 505 can be executable by the processor 501 to implement some or all of the methods, steps, operations, actions, or other functionality that is disclosed herein. Executing the instructions 505 can involve the use of the data 507 that is stored in the memory 503. Unless otherwise specified, any of the various examples of modules and components described herein can be implemented, partially or wholly, as instructions 505 stored in memory 503 and executed by the processor 501. Any of the various examples of data described herein can be among the data 507 that is stored in memory 503 and used during execution of the instructions 505 by the processor 501.

Although just a single processor 501 is shown in the computing device 500 of FIG. 5, in an alternative configuration, a combination of processors (e.g., an Advanced RISC (Reduced Instruction Set Computer) Machine (ARM) and a digital signal processor (DSP)) could be used.

The computing device 500 can also include one or more communication interfaces 509 for communicating with other electronic devices. The communication interface(s) 509 can be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The computing device 500 can also include one or more input devices 511 and one or more output devices 513. Some examples of input devices 511 include a keyboard, mouse, microphone, remote control device, button, joystick, trackball, touchpad, and lightpen. One specific type of output device 513 that is typically included in a computing device 500 is a display device 515. Display devices 515 used with embodiments disclosed herein can utilize any suitable image projection technology, such as liquid crystal display (LCD), light-emitting diode (LED), gas plasma, electroluminescence, wearable display, or the like. A display controller 517 can also be provided, for converting data 507 stored in the memory 503 into text, graphics, and/or moving images (as appropriate) shown on the display device 515. The computing device 500 can also include other types of output devices 513, such as a speaker, a printer, etc.

The various components of the computing device 500 can be coupled together by one or more buses, which can include a power bus, a control signal bus, a status signal bus, a data bus, etc. For the sake of clarity, the various buses are illustrated in FIG. 5 as a bus system 519.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random-access memory (RAM), read-only memory (ROM), magnetic disk storage media, optical storage media, flash memory devices in RAM, various types of storage class memory, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for implementing a configuration change on a production network having a set of network devices that includes live traffic control planes and live traffic forwarding planes, the method comprising:

generating replicated ghost control planes and replicated ghost forwarding planes within a same set of network devices by replicating the live traffic control planes and the live traffic forwarding planes within the same set of network devices;

routing customer traffic using the live traffic control planes and the live traffic forwarding planes according to a first set of configuration settings; and routing test traffic using the replicated ghost control planes and the replicated ghost forwarding planes according to a second set of configuration settings that differs from the first set of configuration settings.

2. The method of claim 1, further comprising:

verifying a ghost routing table of a replicated ghost control plane and a ghost forwarding table of a replicated ghost forwarding plane the second set of configuration settings based on the test traffic; and based on verifying the ghost routing table and the ghost forwarding table, routing the customer traffic through the live traffic control planes and the live traffic forwarding planes using the second set of configuration settings.

3. The method of claim 1, wherein:

a live traffic control plane operates on a first network device of the same set of network devices; and a replicated ghost control plane operates on the first network device parallel with the live traffic control plane.

4. The method of claim 3, wherein:

a live traffic forwarding plane operates on a second network device of the same set of network devices; and a replicated ghost forwarding plane operates on the second network device parallel with the live traffic forwarding plane.

5. The method of claim 1, wherein the same set of network devices include:

an application-specific integrated circuit (ASIC) that implements a live traffic control plane and a replicated ghost control plane; and ASIC control software.

6. The method of claim 5, further comprising utilizing debugging software to verify that the ASIC and the ASIC control software operate correctly with the second set of configuration settings on the replicated ghost control planes and the replicated ghost forwarding planes.

7. The method of claim 1, further comprising generating the test traffic utilizing debugging software that differs from the customer traffic.

8. The method of claim 1, further comprising detecting a bug originating in a replicated ghost forwarding plane based on routing the test traffic without affecting the customer traffic in the production network.

9. The method of claim 1, further comprising detecting, after routing the test traffic, a hardware bug resulting from an interaction between a ghost control plane and a ghost forwarding plane.

10. The method of claim 1, wherein generating the replicated ghost control planes includes:

logically partitioned a network device from the same set of network devices into a first partition having a replicated ghost control plane; and logically partitioned the network device into a second partition having a live traffic control plane.

11. The method of claim 10, further comprising using virtual routing and forwarding (VRF) to logically partition the first partition and the second partition in the network device.

12. The method of claim 1, wherein the second set of configuration settings includes an access-control list (ACL) or a route filter not present in the first set of configuration settings.

13. The method of claim 1, wherein a main network having the live traffic control planes and a ghost network having the replicated ghost control planes route to a same internet protocol (IP) address space.

14. The method of claim 1, further comprising utilizing shared ternary content-addressable memory (TCAM) entries for overlapping routes in ghost routing tables and live traffic routing tables in the same set of network devices.

15. A method for implementing a configuration change on a production network that includes a first network device with a live traffic control plane and a second network device with a live traffic forwarding plane, the method comprising:

logically partitioning the first network device into a first main partition that routes customer traffic using the live traffic control plane according to a first set of configuration settings;

logically partitioning the first network device into a first ghost partition that routes test traffic using a replicated ghost control plane according to a second set of configuration settings that differs from the first set of configuration settings, wherein the first network device includes the first main partition and the first ghost partition;

logically partitioning the second network device into a second main partition that routes the customer traffic using the live traffic forwarding plane according to the first set of configuration settings; and logically partitioning the second network device into a second ghost partition that routes the test traffic using a replicated ghost forwarding plane according to the second set of configuration settings.

16. The method of claim 15, further comprising generating the replicated ghost control plane within the first network device and the replicated ghost forwarding plane within the second network device.

17. The method of claim 15, wherein:

the production network includes:

a set of network devices including the first network device and the second network device; and computing devices for providing computing services to customers; and the set of network devices routes the customer traffic to the computing devices.

18. The method of claim 15, further comprising using debugging software to:

generate the test traffic; and verify ghost routing tables and ghost forwarding tables within the first ghost partition of the first network device.

19. The method of claim 15, wherein:

the production network includes a physical interface between the first network device and the second network device;

the physical interface includes a logical sub-interface;

the customer traffic is routed through the physical interface; and the test traffic is routed through the logical sub-interface.

20. A system comprising:

a production network having:

computing devices that provide computing services; and a set of network devices with live traffic control planes and live traffic forwarding planes;

a processor; and a computer memory comprising instructions that, when executed by the processor, cause the system to carry out operations comprising:
generating replicated ghost control planes and replicated ghost forwarding planes within a same set of network devices by replicating the live traffic control planes and the live traffic forwarding planes within the same set of network devices;
routing customer traffic using the live traffic control planes and the live traffic forwarding planes according to a first set of configuration settings; and
routing test traffic using the replicated ghost control planes and the replicated ghost forwarding planes according to a second set of configuration settings that differs from the first set of configuration settings.

* * * * *